(12) United States Patent
Pratt

(10) Patent No.: US 8,961,086 B2
(45) Date of Patent: Feb. 24, 2015

(54) FASTENER AND METHOD OF INSTALLING SAME

(76) Inventor: John D. Pratt, Laguna Niguel, CA (US)

( * ) Notice: Subject to any disclaimer, the term of this patent is extended or adjusted under 35 U.S.C. 154(b) by 138 days.

(21) Appl. No.: 13/617,185

(22) Filed: Sep. 14, 2012

(65) Prior Publication Data

US 2013/0061451 A1    Mar. 14, 2013

Related U.S. Application Data

(60) Provisional application No. 61/534,495, filed on Sep. 14, 2011.

(51) Int. Cl.
| F16B 19/10 | (2006.01) |
| F16B 31/02 | (2006.01) |
| F16B 37/06 | (2006.01) |

(52) U.S. Cl.
CPC ............. *F16B 19/1072* (2013.01); *F16B 31/02* (2013.01); *F16B 37/067* (2013.01)
USPC .................................... 411/34; 411/55; 411/1

(58) Field of Classification Search
USPC .............. 411/1–3, 5, 34, 39, 43, 258, 277, 55
See application file for complete search history.

(56) References Cited

U.S. PATENT DOCUMENTS

| | | | |
|---|---|---|---|
| 2,282,711 A | 5/1942 | Eklund | |
| 3,129,630 A | 4/1964 | Wing et al. | |
| 3,136,203 A | 6/1964 | Davis | |
| 3,203,303 A | 8/1965 | Laisy | |
| 3,236,143 A | 2/1966 | Wing | |
| 3,369,442 A | 2/1968 | Darby et al. | |
| 3,643,544 A | 2/1972 | Massa | |
| 3,657,956 A * | 4/1972 | Bradley et al. ................. | 411/43 |
| 3,858,479 A * | 1/1975 | Sekhon ........................... | 411/34 |
| 4,033,222 A | 7/1977 | Wilson | |
| 4,089,247 A | 5/1978 | Dahl et al. | |
| 4,142,439 A | 3/1979 | Landt | |
| 4,168,650 A | 9/1979 | Dahl et al. | |
| 4,203,346 A | 5/1980 | Hall et al. | |
| 4,237,768 A | 12/1980 | Volkmann | |
| 4,312,613 A | 1/1982 | Binns | |
| 4,364,697 A | 12/1982 | Binns | |
| 4,376,604 A | 3/1983 | Pratt et al. | |
| 4,405,273 A * | 9/1983 | Ruhl et al. ....................... | 411/43 |
| 4,457,652 A | 7/1984 | Pratt | |
| 4,579,491 A * | 4/1986 | Kull ................................ | 411/43 |
| 4,659,271 A | 4/1987 | Pratt et al. | |
| 4,659,272 A * | 4/1987 | Pratt ............................... | 411/43 |
| 4,681,484 A | 7/1987 | Egger | |
| 4,699,552 A * | 10/1987 | Jeal ................................ | 411/43 |
| 4,747,204 A | 5/1988 | Pratt et al. | |

(Continued)

*Primary Examiner* — Flemming Saether
(74) *Attorney, Agent, or Firm* — Barnes & Thornburg LLP

(57) ABSTRACT

A fastener comprises a body having an enlarged head at a first end, a tapered ramp at a second end, a cylindrical shank disposed between the enlarged head and the tapered ramp, internal threads, and a cylindrical passage formed through the body between the first and second ends. The fastener further includes a generally cylindrical corebolt having first and second threaded sections separated by a third non-threaded section, the corebolt disposed within the passage of the body and a sleeve having a generally cylindrical passage therethrough and movably disposed over a portion of the corebolt. A nut is in threaded engagement with the corebolt and is disposed adjacent an end of the sleeve. An interface between the corebolt and the nut is configured to resist relative rotation of the nut with respect to the corebolt until the sleeve is in abutment with a workpiece.

12 Claims, 9 Drawing Sheets

(56) References Cited

U.S. PATENT DOCUMENTS

| | | |
|---|---|---|
| 4,752,169 A | 6/1988 | Pratt |
| 4,772,167 A | 9/1988 | Beals |
| 4,778,318 A * | 10/1988 | Jeal ................................ 411/43 |
| 4,900,205 A | 2/1990 | Sadri |
| 4,950,115 A | 8/1990 | Sadri |
| 4,967,463 A | 11/1990 | Pratt |
| 5,046,348 A | 9/1991 | Pratt |
| 5,066,179 A | 11/1991 | Pratt |
| 5,123,792 A * | 6/1992 | Strobel ........................... 411/55 |
| 5,152,648 A | 10/1992 | Pratt |
| 5,498,110 A | 3/1996 | Stencel et al. |
| 5,634,751 A | 6/1997 | Stencel et al. |
| 6,547,500 B2 | 4/2003 | Cosenza et al. |
| 2008/0080114 A1 | 4/2008 | Schweitzer et al. |

* cited by examiner

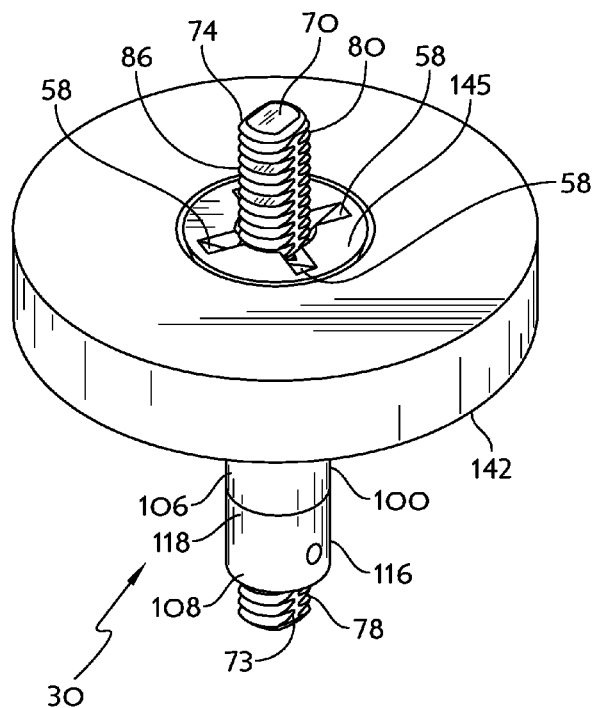
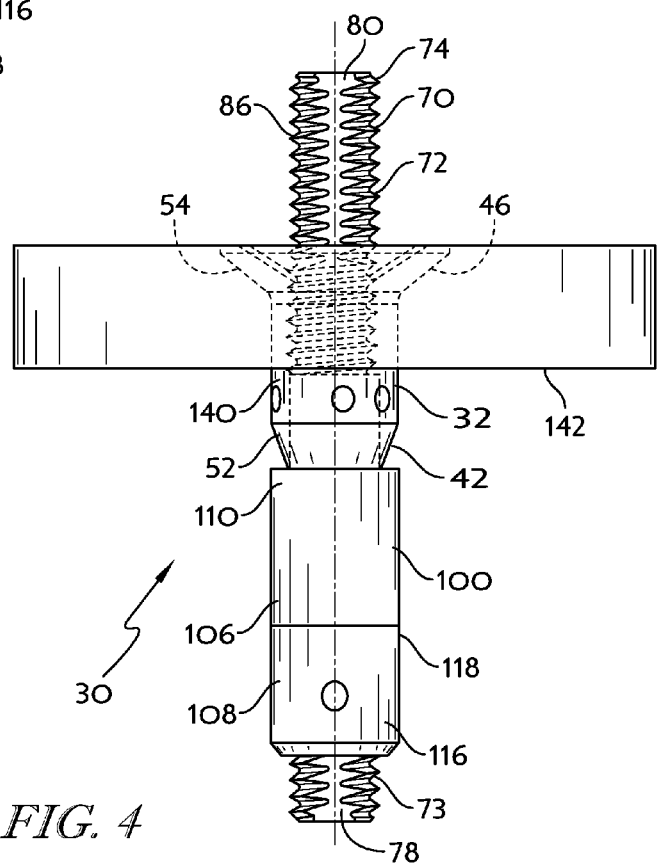
FIG. 3
FIG. 4

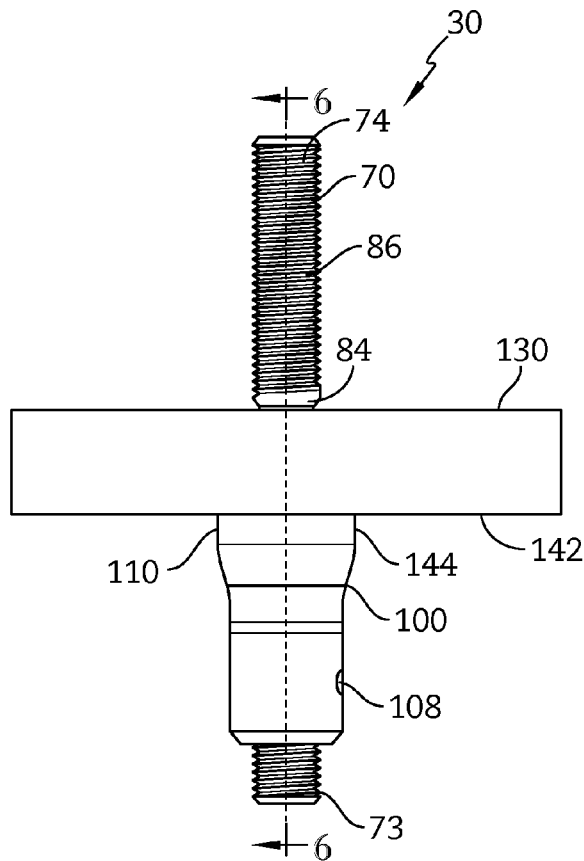
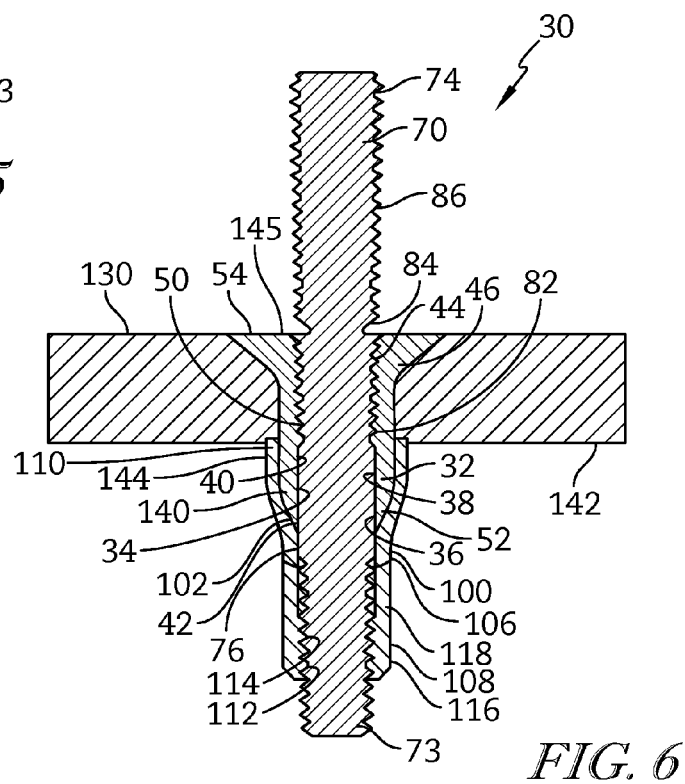
FIG. 5
FIG. 6

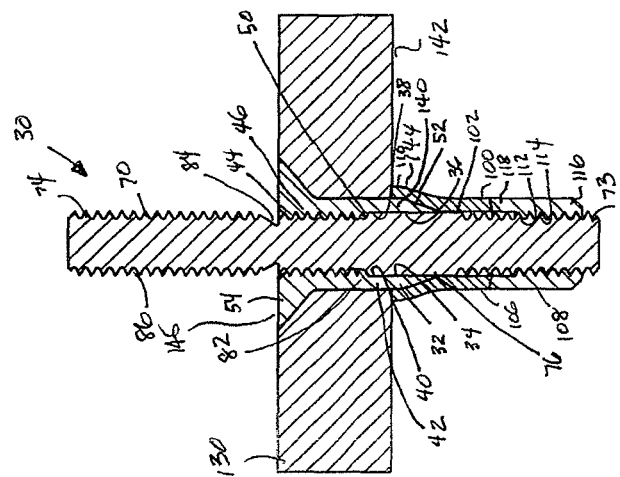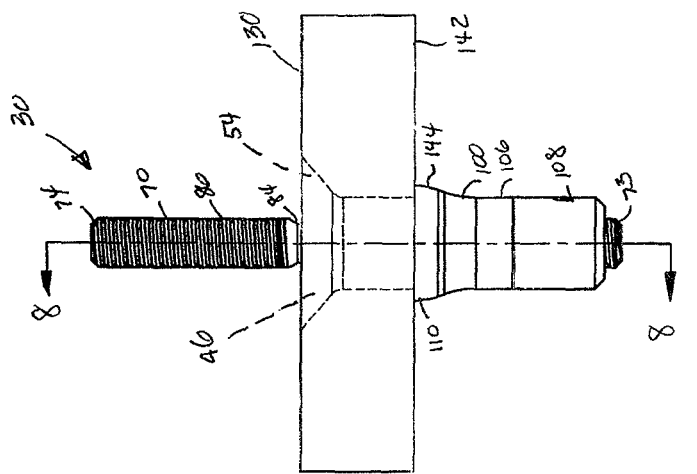

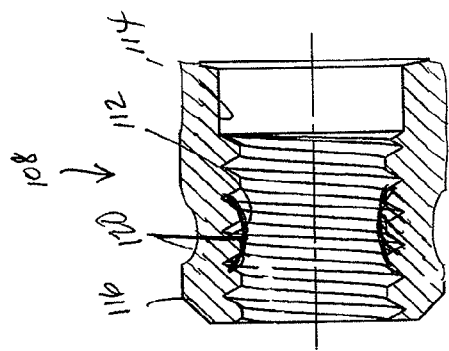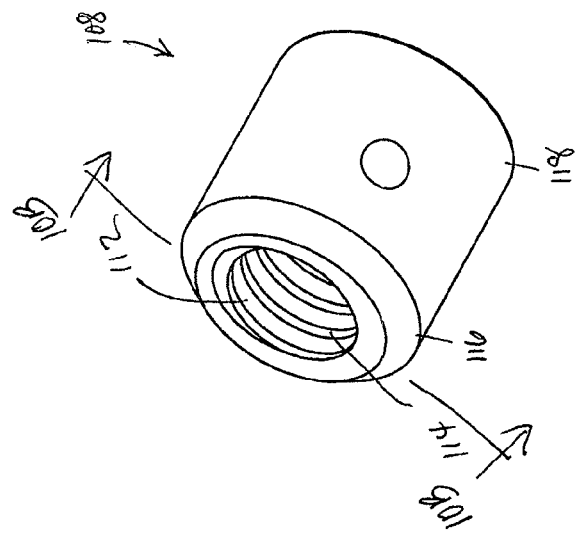

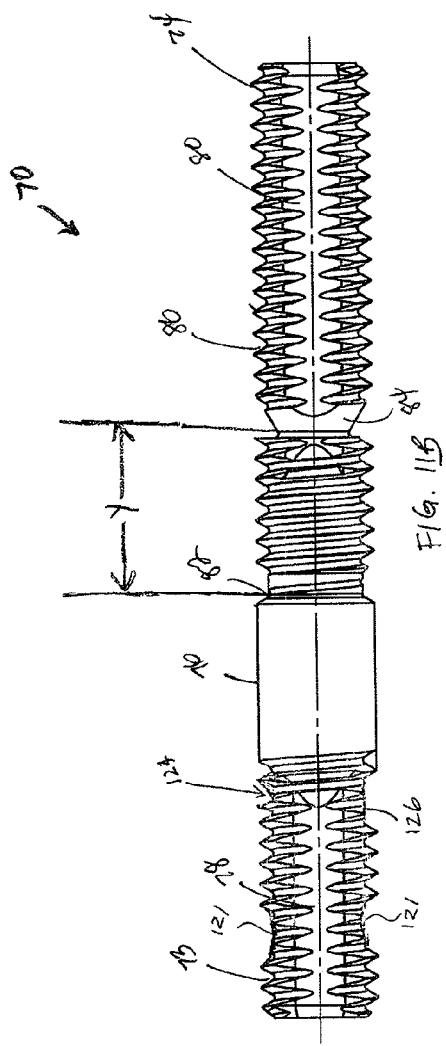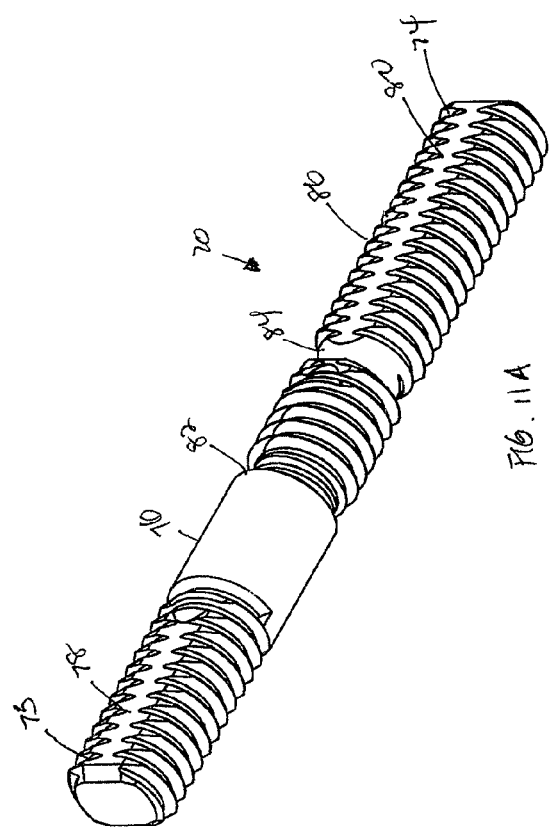

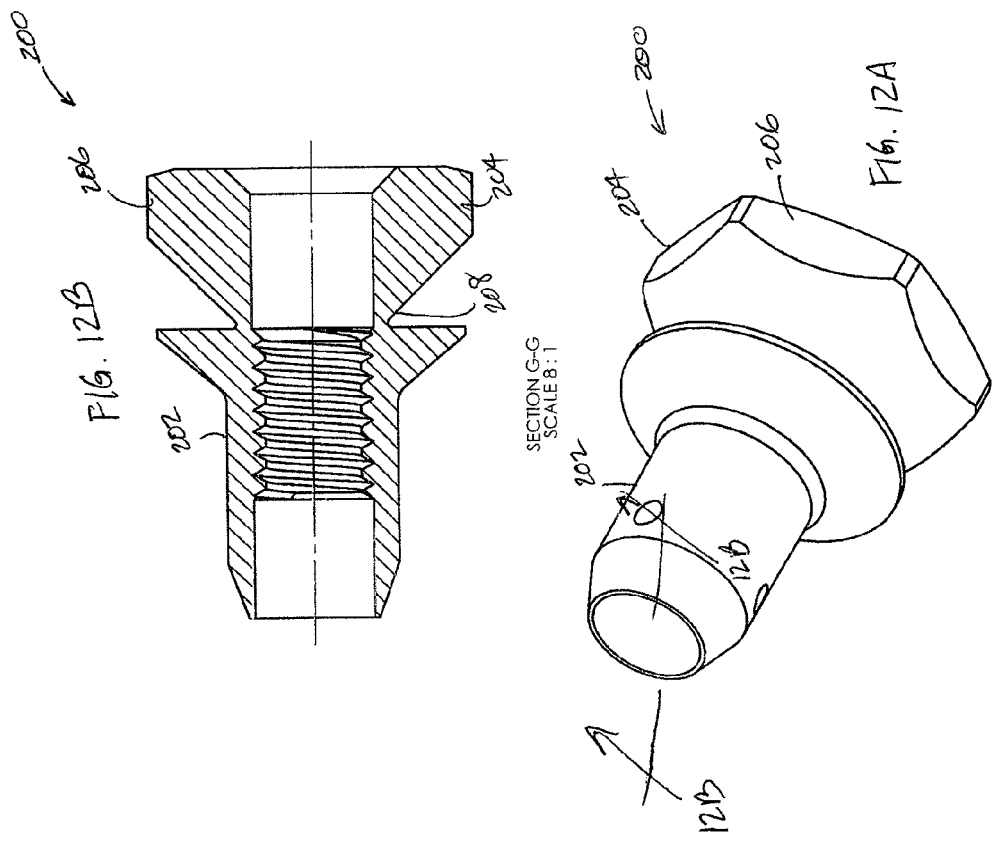

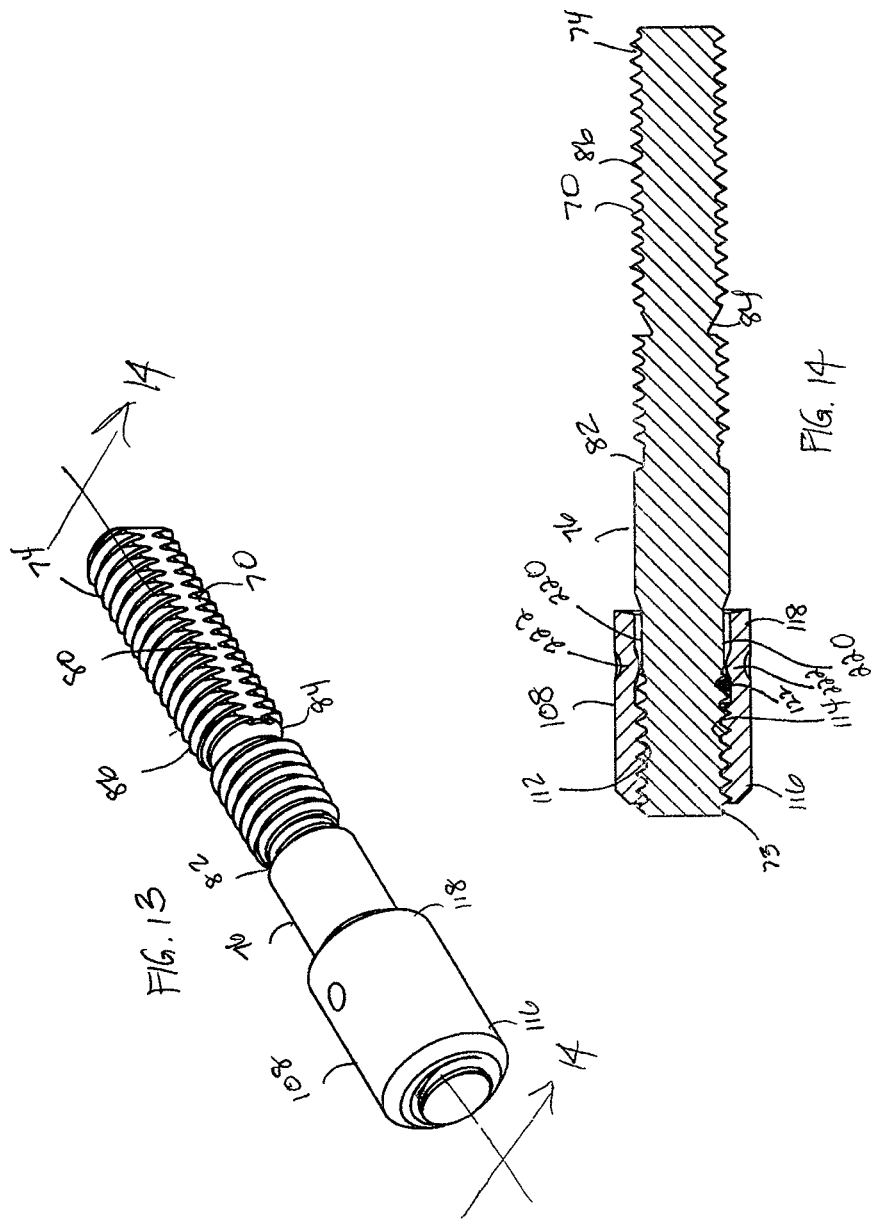

US 8,961,086 B2

FASTENER AND METHOD OF INSTALLING SAME

CROSS REFERENCE TO RELATED APPLICATIONS

This application claims the benefit of Pratt U.S. Provisional Application Ser. No. 61/534,495, filed on Sep. 14, 2011, and entitled "Fastener and Method of Installing Same."

BACKGROUND

1. Field of the Disclosure

The present disclosure relates generally to fasteners for assembly of two or more panels of a workpiece, and more particular to a blind fastener having an installed flushness that requires little, if any, post-installation shaving or filling.

2. Description of the Background

Exterior airframe joints are required to be flush to reduce aerodynamic drag. It is therefore desirable to prevent any portion of a mechanical fastener from protruding beyond a surface of an outer panel of a workpiece in which the fastener is installed. It is also preferred to prevent any portion of a fastener from being recessed within the workpiece or recessed as compared to the remainder of the fastener. Having all portions of the fastener and the surface of the outer panel of the workpiece in an even plane is referred to as the "flushness" of the fastener. It is further desired to minimize the visibility of mechanical fasteners on an aircraft's exterior in order to improve appearance. Such flushness and appearance goals are easily met with conventional fasteners such as solid rivets, lock bolts, and threaded pins with nuts. Many pull-type blind fasteners also exhibit acceptable installed flushness. However, threaded blind bolts have always suffered from the need to have a corebolt break-off location vary by as much as 0.103 inch so that, in some grip conditions, the corebolt either protrudes above the surface of the outer panel by this amount or, if the break-off location is positioned to never break above the exposed body head surface, the corebolt breaks low, thereby leaving a cavity up to 0.103 inch deep. In either case, the fastener oftentimes requires milling of the protruding corebolt or filling (potting) of the cavity to produce the desired level of aerodynamic flushness.

A need therefore exists for a threaded blind fastener that produces a predictable and consistent flush installation throughout the gripping range and that minimizes the need for post-installation milling or potting.

SUMMARY

According to one aspect of the present disclosure, a fastener includes a body having an enlarged head at a first end, a tapered ramp at a second end, a cylindrical shank disposed between the enlarged head and the tapered ramp, internal threads, and a cylindrical passage formed through the body between the first and second ends. The fastener further includes a generally cylindrical corebolt having first and second threaded sections separated by a third non-threaded section, the corebolt disposed within the passage of the body. A sleeve having a cylindrical passage therethrough is movably disposed over a portion of the corebolt and a nut is in threaded engagement with the corebolt and disposed adjacent an end of the sleeve. The fastener still further includes means for restricting relative rotation between the nut and the corebolt until the sleeve has formed a blind head against a workpiece.

According to another aspect of the present disclosure, a fastener includes a body having an enlarged head at a first end, a tapered ramp at a second end, a cylindrical shank disposed between the enlarged head and the tapered ramp, internal threads, and a cylindrical passage formed through the body between the first and second ends. The fastener further includes a generally cylindrical corebolt having first and second threaded sections separated by a third non-threaded section, the corebolt disposed within the passage of the body. A sleeve having a cylindrical passage therethrough is movably disposed over a portion of the body and a nut is in threaded engagement with the corebolt and disposed adjacent an end of the sleeve. An interface between the corebolt and the nut is configured to resist relative rotation of the nut with respect to the corebolt until the sleeve is in abutment with a workpiece.

According to a different aspect of the present disclosure, a method of installing a fastener in a workpiece includes the step of inserting a fastener into a workpiece. The fastener includes a body having an enlarged head at a first end, a tapered ramp at a second end, internal threads, a cylindrical shank disposed between the enlarged head and the tapered ramp, and a cylindrical passage formed through the body between the first and second ends. The fastener further includes a generally cylindrical corebolt having first and second threaded sections separated by a third non-threaded section, the corebolt being disposed within the passage of the body. A sleeve having a cylindrical passage therethrough is movably disposed over a portion of the corebolt and a nut is in threaded engagement with the corebolt and disposed adjacent an end of the sleeve. The method further includes the steps of restricting relative rotation between the corebolt and the nut and rotating the corebolt and the nut while rotationally restraining the body, until the sleeve has formed a blind head against the workpiece.

BRIEF DESCRIPTION OF THE DRAWINGS

FIG. 3 is a isometric view of the fastener of FIG. 1 inserted into aligned apertures of two or more panels forming a workpiece, wherein a thickness of the workpiece corresponds to a minimum grip condition;

FIG. 4 is a side elevational view of FIG. 3 showing the body and corebolt in phantom to illustrate how the fastener fits within the workpiece corresponding to minimum grip condition before installation;

FIG. 5 is a side elevational view similar to that of FIG. 4 after an installation tool has been activated to rotate the corebolt such that the corebolt moves inwardly toward the workpiece, thereby pushing the sleeve inwardly against the workpiece;

FIG. 6 is a cross-sectional view taken generally along the lines 6-6 of FIG. 5 and showing the installation phase of FIG. 5;

FIG. 7A is a side elevational view similar to that of FIG. 5 and showing the body (in phantom) within the workpiece, wherein a thickness of the workpiece corresponds to a maximum grip condition;

FIG. 7B is a cross-sectional view similar to that of FIG. 6 and showing the installation phase and grip condition of FIG. 7A;

FIG. 10A is an isometric view of a nut for use with any of the fasteners disclosed herein;

FIG. 10B is a cross-sectional view taken generally along the lines 10B-10B of FIG. 10A;

FIG. 11A is an isometric view of a corebolt for use with any of the fasteners disclosed herein;

FIG. 11B is a side elevational view of the corebolt of FIG. 11A;

FIG. 12A is a bottom isometric view of a frangible wrenching element for use in a further embodiment of a fastener;

FIG. 12B is a cross-sectional view taken generally along the lines 12B-12B of FIG. 12A;

FIG. 13 is an isometric view of a further embodiment of a fastener, with a body and sleeve having been removed therefrom; and FIG. 14 is a cross-sectional view taken generally along the lines 14-14 of FIG. 13.

Other aspects and advantages of the present disclosure will become apparent upon consideration of the following detailed description, wherein similar structures have like or similar reference numerals.

DETAILED DESCRIPTION

Figure 1:
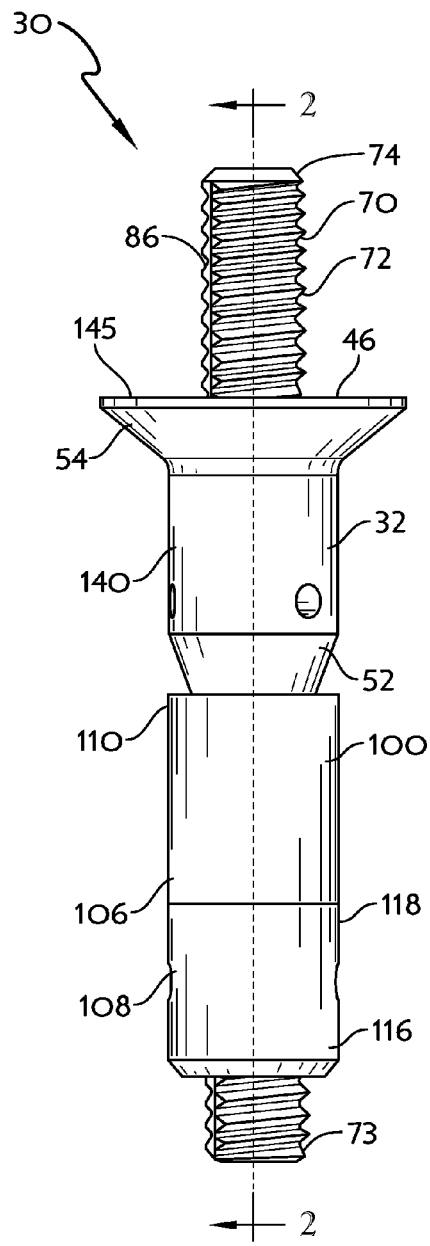
FIG. 1 is a side elevational view of a first embodiment of a fastener that may be used to connect two or more panels forming a workpiece, by a single operator or mechanic.
Figure 2:
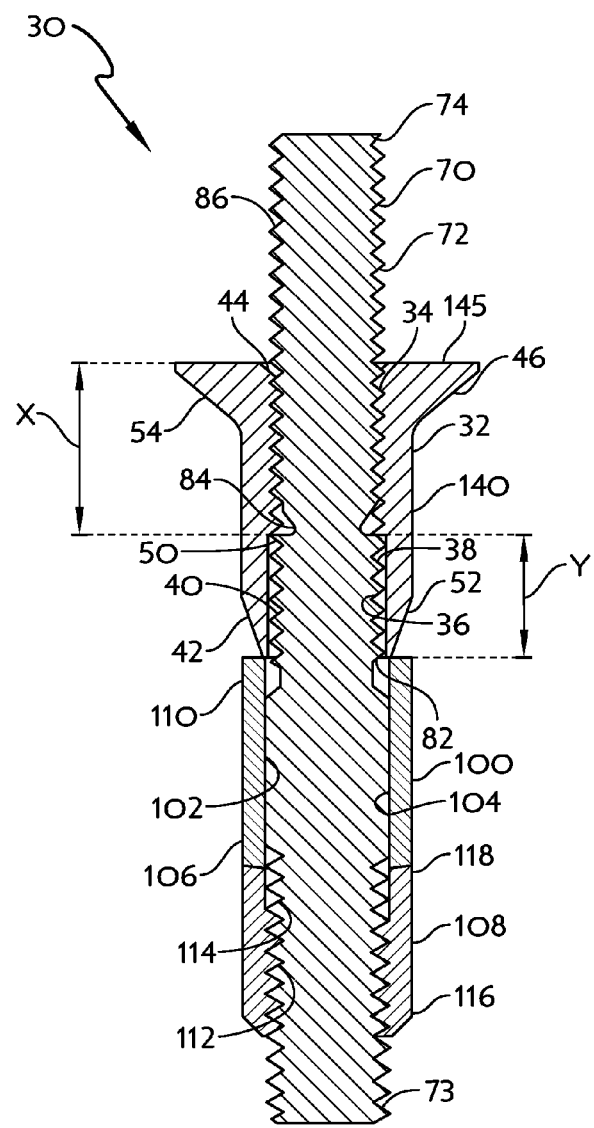
FIG. 2 is a cross-sectional view taken generally along the lines 2-2 of FIG. 1 and depicting the fastener of FIG. 1 having a body, a translating threaded corebolt disposed within the body and having a breaking groove, a sleeve disposed over the corebolt and adjacent a tapered ramp of the body, and a nut disposed adjacent the sleeve.
Figure 9A:
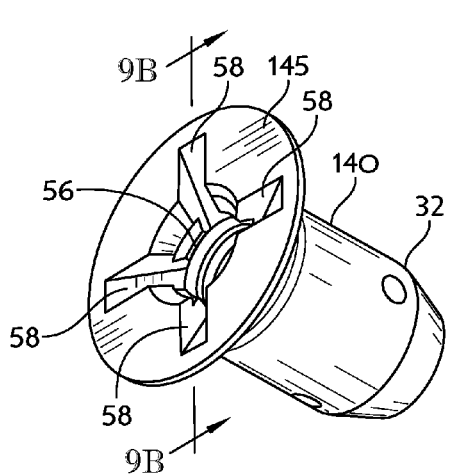
FIG. 9A is a top isometric view of a body for use with any of the fasteners disclosed herein.
Figure 9B:
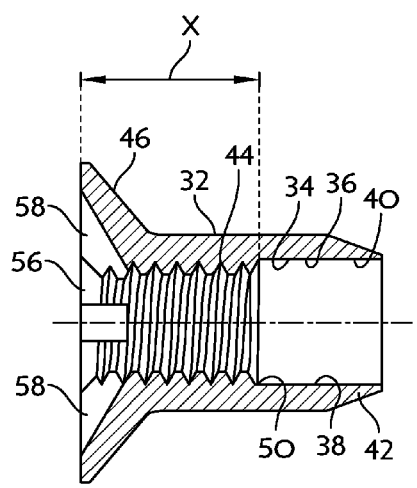
FIG. 9B is a cross-sectional view taken generally along the lines 9B-9B of FIG. 9A.

Referring to FIGS. 1 and 2, a first embodiment of a fastener or blind bolt 30 in accordance with the present disclosure includes a generally cylindrical body 32 having a passage 34 disposed through a central portion of the body 32. Also referring to FIGS. 9A and 9B, an inner surface 36 of a wall 38 forming the passage 34 includes a non-threaded portion 40 at a first end 42 of the body 32 and a threaded portion 44 at a second end 46 of the body 32. The non-threaded and threaded portions 40, 44 are separated by a shoulder portion 50. The body 32 further includes a tapered ramp 52 disposed on an outer surface of the body 32 at the first end 42 and an enlarged head 54 is disposed at the second end 46 of the body 32. As best seen in FIG. 9A, a recess 56 with outwardly extending recesses 58 is disposed within the enlarged head 54, as will be discussed in greater detail hereinafter.

A generally cylindrical corebolt 70, as best seen in FIGS. 1, 2, 11A, and 11B, is concentrically disposed within the passage 34 of the body 32. As best seen in FIGS. 11A and 11B, the corebolt 70 includes first and second end portions 73, 74 that are threaded and a central portion 76 disposed between the first and second end portions 73, 74 that is unthreaded. Each of the first and second end portions 73, 74 includes opposing flats 78, 80, respectively. The threading of the first end portion 73 terminates at a shoulder portion 82 and a circumferential break groove 84 is disposed in a central portion of the corebolt 70 within the threading of the second end portion 74. The second end portion 74 forms a pintail 86 that terminates at the break groove 84 and which is discarded upon completion of installation, as will be discussed in greater detail hereinafter.

Now referring to FIGS. 1 and 2, the fastener 30 further includes a deformable cylindrical sleeve 100 having a throughbore 102. An inner surface 104 forming the throughbore 102 is generally cylindrical, although counterbores or internal tapered bores may also be incorporated as required by the specific application. A first end 106 of the sleeve 100 is positioned around the first portion 73 of the corebolt adjacent a nut 108 and a second end 110 of the sleeve 100 is positioned adjacent the first end 42 of the body 32. As seen in FIGS. 1, 2, 10A, and 10B, the nut 108 includes an inner cylindrical surface 112 forming a throughbore 114 and the nut 108 includes first and second ends 116, 118 with the entire surface 112 being threaded except at the second end 118. The nut 108 is in threaded engagement with the first end portion 73 of the corebolt 70 with the second end 118 of the nut 108 bearing against the sleeve 100. The nut 108 is secured to the first end portion 73 of the corebolt 74 such that a predetermined level of torque is required to begin threading the corebolt 70 through the nut 108.

The nut 108 includes means for restricting relative motion between the nut 108 and the corebolt 70. An example of such means includes crimping of the nut 108 to remove any gaps between opposing threads, thereby preventing rotation of the corebolt 70 and nut 108 with respect to one another until a predetermined level of torque is applied. In another embodiment, the means includes a portion of material 120 from the nut 108 displaced into one or more non-helical grooves 121 (FIG. 11B) within the threaded region of the corebolt 70, for example, at a point just prior to the threading on the first end portion 73 (such as adjacent the non-threaded portion 40). The crimping of the nut 108 and/or displacement of a portion of material 120 from the nut 108 into the groove(s) 121 is sufficient to delay the onset of rotation relative to the corebolt and cause interference between the threaded first end portion 73 and the nut 108 due to mechanical distortion of the nut 108. Other optional means include, but are not limited to, a chemical adhesive (see 122 in FIG. 14) disposed in the threading of the first end portion 73 adjacent the nut 108 (or in the threading of the nut 108), chemical threadlockers, dimensional interference (see 124 in FIG. 11B) between the threads of one or both of the nut 108 and the corebolt 70 where the nut 108 is disposed on the corebolt 70 to prevent movement of the nut 108 along the corebolt 70, and/or a deformation of the thread in the corebolt 70 and/or the nut 108 (see, for example, 126 in FIG. 11B) where the nut 108 is attached to the corebolt 70. The deformation seen in FIG. 10B can be formed through crimping or by any other manner known in the art.

FIGS. 3 and 4 depict the fastener 30 of FIGS. 1 and 2 inserted into two or more panels forming a workpiece 130, wherein a thickness of the workpiece 130 corresponds to a minimum grip condition. The fasteners 30 disclosed herein can be inserted within and suitably installed within workpieces 130 having thicknesses ranging between a minimum grip thickness and a maximum grip thickness wherein maximum grip is generally defined as 1/16-inch more than minimum grip for a particular length fastener. When a minimum grip condition is referenced, it is meant that the fastener 30 is installed within a workpiece 130 having the minimum grip thickness for a particular length fastener. Similarly, when a maximum grip condition is referenced, it is meant that the fastener 30 is installed within a workpiece 130 having a maximum grip thickness. FIGS. 5 and 6 depict the fastener 30 of FIGS. 1 and 2 as the fastener 30 is installed within the workpiece 130 and prior to detachment of the pintail 86 of the corebolt 70. The fastener 30 is installed using blind bolt installation tools as are known in the art. The workpiece 130 is generally comprised of two or more sheets, or panels of material, or two or more structural elements. Before installation of the fastener 30 within the workpiece 130, the fastener 30 is inserted into aligned apertures in the panels forming the workpiece 130 (see FIGS. 3 and 4). The corebolt 70 is thereafter rotated while the body 32 is rotationally restrained, thereby causing the nut 108 to move toward the workpiece 130. Movement of the nut 108 toward the workpiece 130 forces the sleeve 100 up the tapered ramp 52 disposed at the first end 42 of the body 32 and along a shank 140 of the body 32 into contact with an inner surface 142 of the workpiece 130, as seen in FIGS. 5 and 6. Further rotation of the corebolt 70 compresses the sleeve 100 against the workpiece 130 to form a blind head 144, as further seen in FIGS. 5 and 6. The torque required to continue rotation of the corebolt 70 greatly increases after the blind head 144 has been completely formed and compressed against the workpiece 130.

Figure 8:
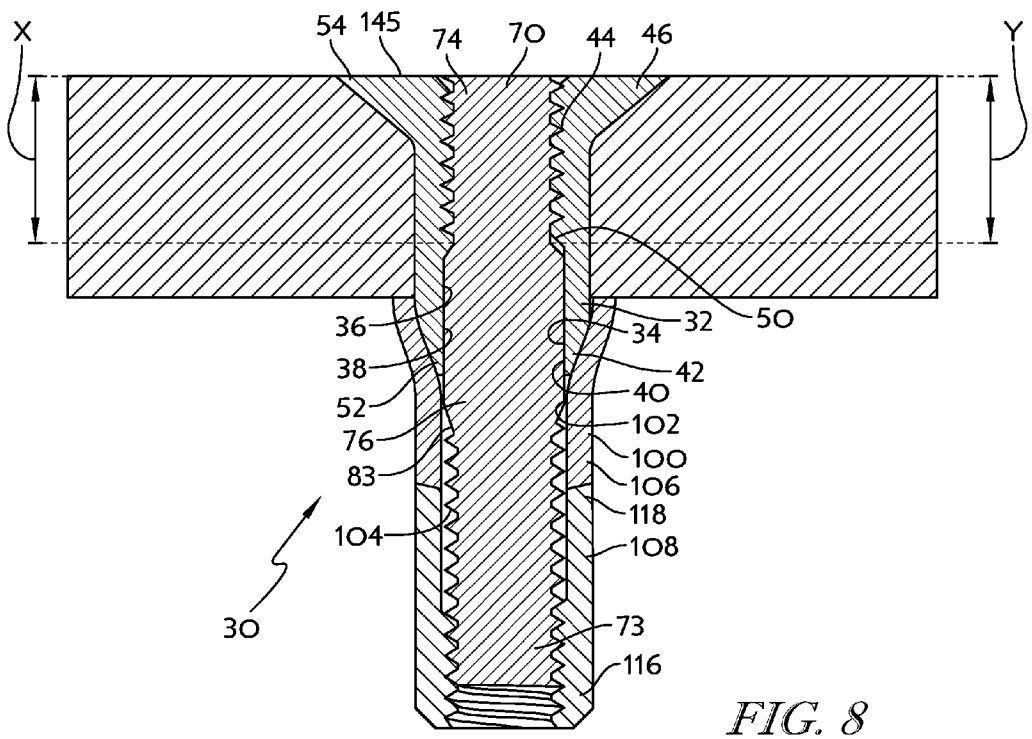
FIG. 8 is a cross-sectional view similar to that of FIG. 7B and showing the installation phase of FIG. 7A in a maximum grip condition after the pintail has separated.

Further rotation of the corebolt 70 causes the second end portion 74 of the corebolt 70 to thread through the nut 108, while the second end 118 of the nut 108 remains stationary against the first end 106 of the sleeve 100. Threading of the corebolt 100 through the nut 108 continues until the shoulder portion 82 of the corebolt 70 abuts the shoulder portion 50 of the body 32, as seen in FIGS. 7 and 8, whereupon the torque required to continue threading the corebolt 70 through the body 32 and the nut 108 exceeds the failure torque at the break groove 84 and causes the pintail 86 to break free from the fastener 30. Referring to FIGS. 2, 8, 9B, and 11B, a distance X between the shoulder 50 of the body 32 and an outer surface 145 of the enlarged head 54 of the body 32 is approximately equal to or slightly less than a distance Y between the shoulder portion 82 and the break groove 84 of the corebolt 70. During installation, when the shoulder portion 82 of the corebolt 70 abuts the shoulder 50 of the body 32, the corebolt 70 stops advancing and the pintail 86 breaks off flush with, or slightly above, the outer surface 145 of the enlarged head 54.

During installation of the fastener 30, the body 32 is restrained from rotating with the corebolt 70 such that the corebolt 70 will advance upwardly through the body 32. As described above, the body 32 is rotationally restrained through engagement of the outwardly extending recesses 58 in the enlarged head 54 of the body 32 by protrusions on a non-rotation component of the installation tool, as is well known in the art. Other means for rotationally restraining may be employed, including but not limited to, a separate disposable drive nut, as taught in U.S. Pat. No. 4,967,463, a frangible wrenching member, as taught in U.S. Pat. No. 2,282,711, or simply relying on a press fit between the shank 140 of the body 32 and apertures in the workpiece 130.

In an alternative embodiment, as seen in FIGS. 12A and 12B, similar to the embodiment of FIGS. 1 and 2, the body 32 is replaced by an element 200 having a body 202 similar to the body 32 and an integral frangible wrenching element 204 that may be broken off after installation. The frangible wrenching element 204 is formed as a frangible nut that includes a wrenching region 206 that is used to rotationally restrain the body 202 during installation. The wrenching element 204 may include a break groove 208 sized to allow the wrenching element 204 to be severed from the body 202 upon completion of installation. For example, the wrenching element 204 may be removed after installation with a standard wrench or by twisting the installation tool. The break groove 208 would need to be sized to withstand the reaction torque of installation (which is approximately equal to the torque required to bring the sleeve 100 in contact with the workpiece 130).

FIGS. 13 and 14 depict a further alternative embodiment of the corebolt and nut that is similar to the embodiment of FIGS. 1 and 2, except that the nut 108 is attached to the corebolt 70 in a different manner. In particular, an area of reduced diameter 220 is disposed between the first end portion 73 and the central non-threaded portion 76 of the corebolt 70. The nut 108 is deformed at one or more deformations 222 into the area of reduced diameter 220 to retain the nut 108 on the corebolt 70 and prevent rotational movement of the nut 108 with respect to the corebolt 70.

Any of the embodiments described herein may be modified to include any of the structures or methodologies disclosed in connection with other embodiments or disclosed generally herein.

Further, although directional terminology, such as upper, lower, etc. may be used throughout the present specification, it should be understood that such terms are not limiting and are only utilized herein to convey the orientation of different elements with respect to one another.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A fastener, comprising:
a body having an enlarged head at a first end, a tapered ramp at a second end, a cylindrical shank disposed between the enlarged head and the tapered ramp, internal threads, and a cylindrical passage formed through the body between the first and second ends;
a generally cylindrical corebolt having first and second threaded sections separated by a third non-threaded section, the corebolt disposed within the passage of the body;
a sleeve having a generally cylindrical passage therethrough and movably disposed over a portion of the corebolt;
a nut in threaded engagement with the corebolt and disposed adjacent an end of the sleeve; and
means for restricting relative rotation between the nut and the corebolt until the sleeve has formed a blind head against a workpiece.

2. The fastener of claim 1, wherein the means for restricting movement includes an interference between the threads of the corebolt and the nut.

3. The fastener of claim 2, wherein the means for restricting movement includes chemical adhesive disposed in the threaded connection between the corebolt and the nut.

4. The fastener of claim 2, wherein the means for restricting movement includes a portion of the nut that is deformed into an area of reduced diameter in the corebolt.

5. The fastener of claim 1, wherein the means for restricting movement includes an interference disposed between threads of the corebolt and the nut where the nut is disposed on the corebolt.

6. The fastener of claim 1, wherein the cylindrical passage of the body includes a non-threaded portion at the second end and a threaded portion at the first end, wherein the threaded and non-threaded portions are separated by a shoulder portion.

7. The fastener of claim 6, wherein the first threaded section of the corebolt is separated from the non-threaded section by a shoulder portion and the second threaded section of the corebolt includes a break groove.

8. The fastener of claim 7, wherein the fastener is installed by rotating the corebolt such that the shoulder portion of the corebolt abuts the shoulder portion of the body and the corebolt severs at the break groove.

9. A fastener, comprising:
a body having an enlarged head at a first end, a tapered ramp at a second end, a cylindrical shank disposed between the enlarged head and the tapered ramp, internal threads, and a cylindrical passage formed through the body between the first and second ends;

a generally cylindrical corebolt having a first threaded section, the corebolt disposed within the passage of the body;

a sleeve having a generally cylindrical passage therethrough and movably disposed over a portion of the corebolt;

a nut in threaded engagement with the corebolt and disposed adjacent an end of the sleeve; and wherein an interface between the corebolt and the nut includes a feature other than the first threaded section of the corebolt and wherein the feature increases friction between the first threaded section of the corebolt and the nut to resist relative rotation of the nut with respect to the corebolt until the sleeve is in abutment with a workpiece.

10. The fastener of claim 9, wherein the cylindrical passage of the body includes a non-threaded portion at the second end and a threaded portion at the first end, wherein the threaded and non-threaded portions are separated by a shoulder portion.

11. The fastener of claim 10, wherein the corebolt includes a second threaded section separated from the first threaded section by a non-threaded second and the first threaded section of the corebolt is separated from the non-threaded section by a shoulder portion and the second threaded section of the corebolt includes a break groove.

12. The fastener of claim 11, wherein the fastener is installed by rotating the corebolt such that the shoulder portion of the corebolt abuts the shoulder portion of the body and the corebolt severs at the break groove.

* * * * *